United States Patent [19]
Soudijn et al.

[11] 3,873,534
[45] Mar. 25, 1975

[54] [(PHENOTHIAZINYL)PROPYL]-PIPERI-DYL-BENZIMIDAZOLINONES

[75] Inventors: Willem Soudijn, Turnhout; Ineke Van Wijngaarden, Beerse; Paul Adriaan Jan Janssen, Vosselaar, all of Belgium

[73] Assignee: Janssen Pharmaceutica, N.V., Beerse, Belgium

[22] Filed: Dec. 28, 1973

[21] Appl. No.: 429,245

Related U.S. Application Data

[63] Continuation-in-part of Ser. No. 333,855, Feb. 20, 1973, abandoned.

[52] U.S. Cl............ 260/243 A, 424/247, 260/293.6
[51] Int. Cl............................................. C07d 93/14

[58] Field of Search...................... 260/243 A, 293.6

[56] References Cited
UNITED STATES PATENTS

| | | | |
|---|---|---|---|
| 3,359,265 | 12/1967 | Jucker et al. .................... | 260/243 A |
| 3,574,204 | 4/1971 | Nakanishi et al. .............. | 260/243 A |
| 3,654,270 | 4/1972 | Umemoto et al. .............. | 260/243 A |
| 3,818,017 | 6/1974 | Janssen et al. ................... | 260/293.6 |

*Primary Examiner*—John D. Randolph
*Attorney, Agent, or Firm*—Salvatore R. Conte

[57] ABSTRACT

Compounds of the class of 1-{1-[3-(10-phenothiazinyl)-propyl]-4-piperidyl}-2-benzimidazolinones, useful as neuroleptic agents.

8 Claims, No Drawings

[(PHENOTHIAZINYL)PROPYL]-PIPERIDYL-BENZIMIDAZOLINONES

CROSS-REFERENCE TO RELATED APPLICATIONS

The application is a continuation-in-part of our co-pending application Ser. No. 333,855, filed Feb. 20, 1973, now abandoned.

DESCRIPTION OF THE INVENTION

This invention relates to a novel class of [(phenothiazinyl)-propyl]piperidyl-benzimidazolinones, in particular, those denoted as 1-{1-[3-(10-phenothiazinyl)propyl]-4-piperidyl}-2-benzimidazolinones; which compounds may be structurally represented by the formula:

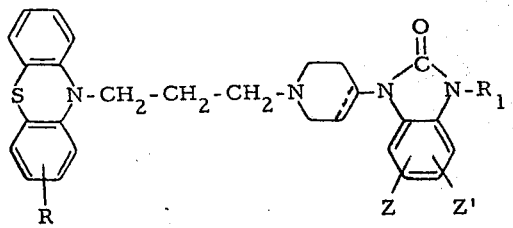

and the therapeutically active non-toxic acid addition salts thereof, wherein R is a member selected from the group consisting of hydrogen, halo, trifluoromethyl and dimethylaminosulfonyl; Z and Z' are selected from the group consisting of hydrogen, halo and methyl; $R_1$ is selected from the group consisting of hydrogen and loweralkyl; and the dotted line indicates an optional double bond.

The "loweralkyl" referred to above is a straight or branch chained alkyl radicals having from 1 to 6 carbon atoms. As used herein, "halo" refers to bromo, fluoro, iodo and chloro, the latter being preferred. In the preferred embodiments, said R is in the 2-position of the phenothiazinyl moiety.

The subject compounds (I) are prepared by reacting an appropriate phenothiazine of formula (II), wherein R is as previously defined and X is a reactive ester of the corresponding alcohol, e.g., chloro, bromo, mesylate, tosylate, preferably chloro or bromo, with a compound of formula (III). This condensation reaction is conveniently conducted in an inert organic solvent such as, for example, an aromatic hydrocarbon, e.g., benzene, toluene, xylene and the like; a lower alkanol, e.g., methanol, ethanol, n-butanol and the like; a ketone, e.g., 4-methyl-2-pentanone, butanone, and the like; an ether, e.g., dioxane, diethyl ether and the like; dimethylformamide (DMF); nitrobenzene; and the like. The addition of an acid acceptor, i.e., an appropriate base such as, for example, an alkali metal carbonate or bicarbonate, or an organic tertiary amine such as, for example, a trialkylamine, e.g., triethylamine, tributylamine and the like, or a heterocyclic amine, e.g., pyridine, quinoline and the like, may be utilized to bind the acid that is liberated during the course of the reaction. The amount of acid acceptor that may be employed is not critical, but, for optimum conditions, the theoretical number of moles of liberated acid can easily be calculated from the quantities of reactants employed and, thus, the corresponding amount of acid acceptor that need be employed can readily be determined. When X is halo, the presence of catalytic amounts of potassium iodide is also desirable. Elevated temperatures may be employed to enhance the rate of reaction.

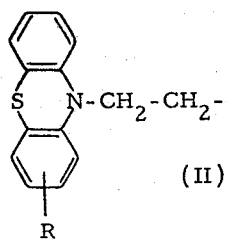 + 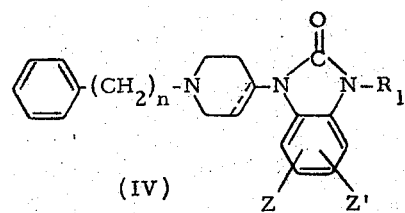 ⟶ (I)

An alternative method for the preparation of the compounds of formula (I) consists in the quaternization of compounds of formula (IV)

wherein n is 1 or 2, by means of compounds of formula (II) followed by dequaternization of the so-obtained compounds ($IV_1$) by known methodologies. When n equals 1, e.g., catalytic debenzylation may be effected; when n equals 2 dequaternization may be carried out, for instance, by treatment of the quaternary ammonium salt with potassium tertiary butylate. The foregoing reactions are illustrated in the following scheme:

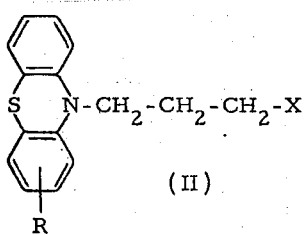 + 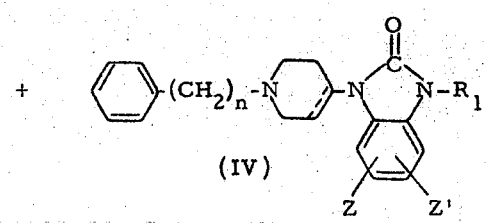

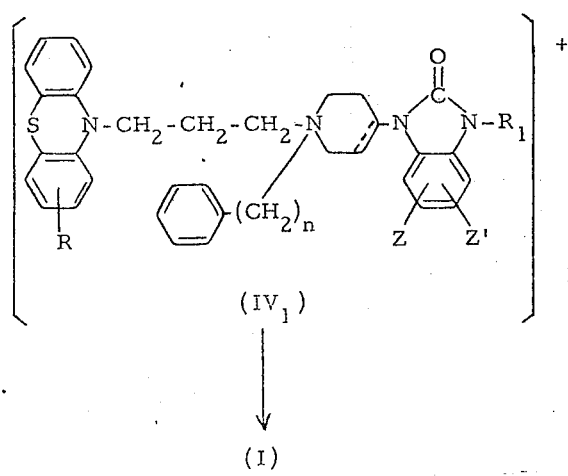

(IV₁)

↓

(I)

Yet another method for the preparation of the compounds (I) consists in starting from a compound (V), reducing the nitro-group thereof by known methods, for example, by catalytic hydrogenation using nobel metal catalysts or by reducing agents, such as, lithium aluminum hydride and the like, in a suitable organic solvent and then effecting ring closure of the obtained compound (VI) to build up the benzimidazolinone-nucleus using appropriate cyclizing agents, such as urea, phosgene and the like. The compounds (I-a) thus-prepared, may be converted to the compounds (I-b) by known alkylation methods, e.g., using trimethylanilinium bromide in the presence of sodium amide in dry toluene. The above reaction-sequence may be illustrated by the following scheme:

The synthesis of compounds (I) may also be achieved by acylating compounds of formula (III) with a suitable acyl halide of formula (VII) preferably the chloride, and further reducing the amide of formula (VIII) with an appropriate reducing agent, such as, lithium aluminum hydride. The above reaction sequence may be illustrated as follows:

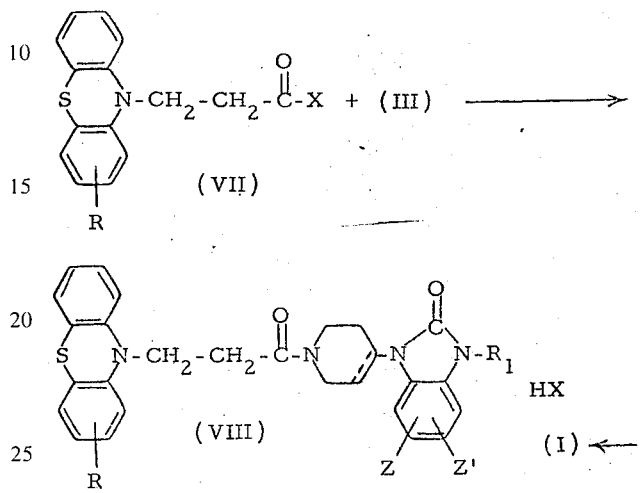

The subject compounds (I) may be converted to the therapeutically active non-toxic acid addition salt form by treatment with an appropriate acid, such as, for example, an inorganic acid, such as a hydrohalic acid, e.g., hydrochloric, hydrobromic and the like; and sulfonic acid, nitric acid, phosphoric acid and the like; or an organic acid, such as, for example, acetic, propionic,

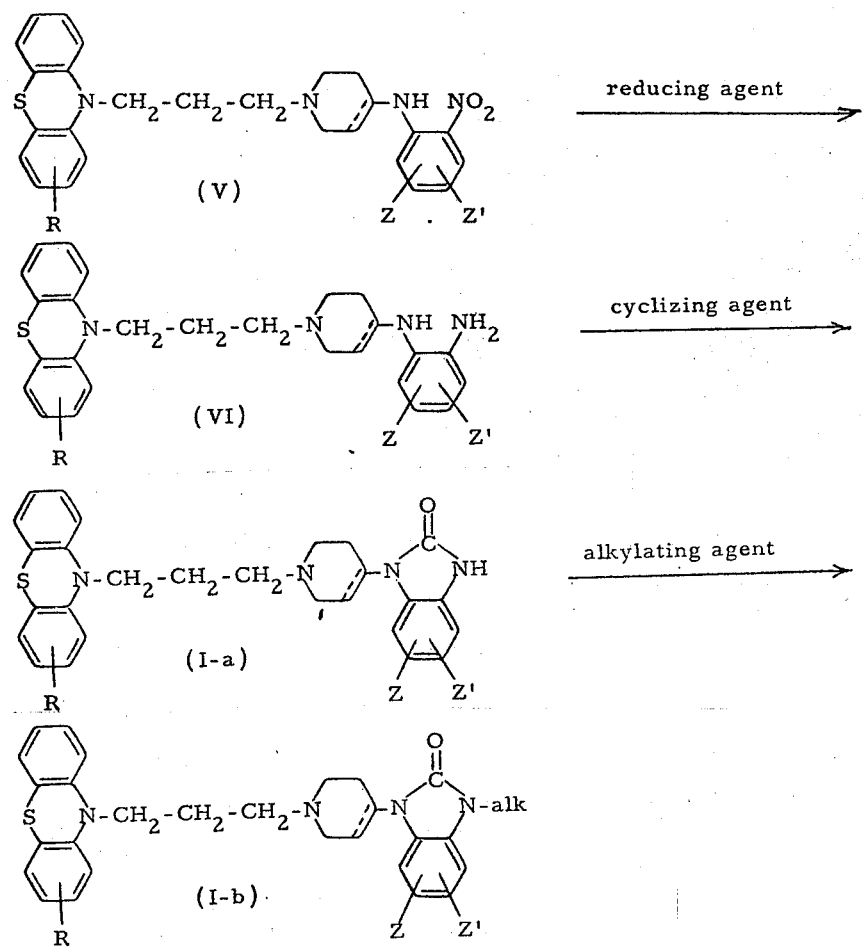

glycolic, lactic, pyruvic, malonic, succinic, maleic, fumaric, malic, tartaric, citric, benzoic, cinnamic, mandelic, methanesulfonic, ethanesulfonic, benzenesulfonic, p-toluenesulfonic, cyclohexanesulfamic, salicylic, p-aminosalicylic and the like acids. Conversely, the salt form can be converted by treatment with alkali into the free base form.

The compounds of formula (I) and the therapeutically active acid addition salts thereof have been found to possess central nervous system (CNS) depressant activity similar to the neuroleptic activity of butyrophenones, for example, haloperidol (see U.S. Pat. No. 3,438,991), and of certain benzimidazolinones, e.g., pimozide (see U.S. Pat. No. 3,196,157) and of the 4-aryl-4-hydroxypiperidines in U.S. Pat. No. 3,575,990. Although the subject compounds are qualitatively similar in neuroleptic activity to haloperidol, they differ significantly from the latter in their longer duration of action, similar to said pimozide and to said 4-aryl-4-hydroxypiperidines.

Neuroleptic drugs are known to block apomorphine-induced vomiting in dogs. In the anti-apomorphine test [see "Method 1" in Janssen, P.A.J. et al., Arzneim-Forsch., 15, 1196 (1965)], the compound to be tested is given orally followed at different time intervals thereafter by the standard dose of apomorphine (0.31 mg/kg s.c.) which will induce vomiting in untreated dogs. Anti-apomorphine activity is demonstrated with the compounds (I) and salts thereof at oral dose levels as low as 0.005 mg/kg and at $ED_{50}$ values of about 0.02–1.0 mg/kg orally. The $ED_{50}$ value (in mg/kg) is the oral dose level of the tested compound protecting 50% of the animals from emesis. In Table 1, the $ED_{50}$ values and the long duration of activity of the most preferred compounds described herein are given.

Another characterization of neuroleptic drugs is their ability to antagonize amphetamine-induced CNS-stimulation. In the amphetamine antagonism test, male Wistar rats are pretreated with an oral dose of the compound to be tested and challenged one hour thereafter with a standard dose of amphetamine (5 mg/kg i.v.). In untreated animals, the standard dose of amphetamine will induce typical CNS-stimulation, e.g., agitation and stereotyped chewing. These phenomena are antagonized by neuroleptic drugs, and, with the subject compounds, such antagonism is observed at oral dose levels of from about 0.05 to about 5.0 mg/kg. The data in Table 1 show the oral dose levels at which the most preferred compounds described herein protect the rats against the amphetamine-induced agitation and chewing.

Table 1

| Compound of Example | Anti-apomorphine test in dogs (oral) | | Amphetamine antagonism in rats (oral) |
|---|---|---|---|
| | $ED_{50}$ | Duration | $ED_{50}$ |
| I | 0.07 mg/kg | 50 hours | 0.63 mg/kg |
| II | 0.06 mg/kg | 80 hours | 2.5 mg/kg |
| III | 0.06 mg/kg | 55 hours | 0.16 mg/kg |

It is understood that the compounds in Table 1 are not listed for purposes of limiting the invention thereto, but only to exemplify the useful properties of all the compounds within the scope of formula (I), including the therapeutically active acid addition salts thereof.

The following examples are intended to illustrate, but not to limit, the scope of the present invention. Unless otherwise stated, all parts are by weight.

EXAMPLE I

A mixture of 1.45 parts of 3-(10-phenothiazinyl)-propylchloride, 1.09 parts of 1-(4-piperidyl)-2-benzimidazolinone, 0.8 parts of sodium carbonate, 0.05 parts of potassium iodide and 7.5 parts of dimethylformamide is stirred for 24 hours at 110°C. The reaction mixture cooled, filtered and the filtrate is diluted with water. The precipitated product is filtered off, washed once more with water and dissolved in boiling acetone. The product crystallizes after cooling. It is filtered off and recrystallized from 2-propanol, yielding 1-{1-[3-(10-phenothiazinyl)propyl]-4-piperidyl}-2-benzimidazolinone; mp. 187.2°C.

EXAMPLE II

A mixture of 1.8 parts of 10-(3-chloropropyl)-2-($\alpha,\alpha,\alpha$-trifluoromethyl)phenothiazine, 1.09 parts of 1-(4-piperidyl)-2-benzimidazolinone, 0.8 parts of anhydrous sodium carbonate, 0.2 parts of potassium iodide and 7.5 parts of dimethylformamide is stirred for 20 hours while heating at 105°C in an oil-bath. The reaction mixture is filtered and the filtrate is diluted with water. The precipitated product is filtered off and recrystallized from ethyl acetate, yielding 1-[1-{3-[2-($\alpha,\alpha,\alpha$-trifluoromethyl)-10-phenothiazinyl]-propyl}-4-piperidyl]-2-benzimidazolinone; mp. 212.1°C.

EXAMPLE III

A mixture of 1.23 parts of 10-(3-chloropropyl)-2-chlorophenothiazine, 1.09 parts of 1-(4-piperidyl)-2-benzimidazolinone, 0.8 parts of anhydrous sodium carbonate, 0.1 parts of potassium iodide and 7.5 parts of dimethylformamide is stirred for 24 hours in an oil-bath at 105°C. The reaction mixture is cooled, filtered over hyflo and the filtrate is diluted with water. The precipitated product is filtered off, washed with water, dried and taken up in ethyl acetate: the product is allowed to crystallize. It is filtered off and recrystallized twice: first from 2-propanol and then from boiling chloroform and an excess of acetone, yielding 1-{1-[3-(2-chloro-10-phenothiazinyl)propyl]-4-piperidyl}-2-benzimidazolinone; mp. 216.2°C (dec.).

EXAMPLE IV

Each of the products obtained in the preceding examples is respectively treated with ethanolic HCl in the standard manner to produce the corresponding hydrochloride acid addition salt. In turn, each of the latter salts is respectively treated with alkali (e.g. aqueous NaOH) to yield the product in base form.

EXAMPLE V

A mixture of 1.72 parts of 10-(3-chloropropyl)-2-(trifluoromethyl)-10H-phenothiazine, 1.26 parts of 5-chloro-1-(4-piperidyl)-2-benzimidazolinone, 0.8 parts of sodium carbonate, 0.2 parts of potassium iodide and 7.5 parts of N,N-dimethylformamide is stirred and heated at 95°C for 20 hours. The reaction mixture is cooled and filtered over hyflo. Upon the addition of water to the filtrate, the product is precipitated. It is filtered off and crystallized twice: first from boiling ethylacetate and then from 2-propanol, yielding, after drying, 5-chloro-1,3-dihydro-1-[1-{3-[2-(trifluoromethyl)-10H-phenothiazin-10-yl]propyl}-4-piperidinyl]-2H-benzimidazol-2-one; mp. 177.6°C.

EXAMPLE VI

Repeating the procedure of Example V but replacing the 10-(3-chloropropyl)-2-(trifluoromethyl)-10H-phenothiazine used therein by an equivalent amount of the appropriate phenothiazine-derivative and the 5-chloro-1-(4-piperidyl)-2-benzimidazolinone by an equivalent amount of the appropriate 1-(4-piperidyl)-2-benzimidazolinones, the following compounds are obtained:

6-chloro-1-{1-[3-(10-phenothiazinyl)propyl]-4-piperidyl}-2-benzimidazolinone;
5,6-dichloro-1-{1-[3-(10-phenothiazinyl)propyl]-4-piperidyl}-2-benzimidazolinone;
5-fluoro-1-{1-[3-(10-phenothiazinyl)propyl]-4-piperidyl}-2-benzimidazolinone; and
5,6-dimethyl-1-{1-[3-(10-phenothiazinyl)propyl]-4-piperidyl}-2-benzimidazolinone.

EXAMPLE VII

A mixture of 1.8 parts of 10-(3-chloropropyl)-2-(α,α,α-trifluoromethyl)phenothiazine, 1.08 parts of 1-(1,2,3,6-tetrahydro-4-pyridyl)-2-benzimidazolinone, 0.8 parts of sodium carbonate, a few crystals of potassium iodide and 7.5 parts of dimethylformamide is stirred for 20 hours at 110°C. The reaction mixture is cooled, filtered and upon the addition of water to the filtrate, the product is precipitated. It is filtered off and purified by column-chromatography, using a mixture of chloroform and 10% of methanol. The pure fractions are collected and the solvent is evaporated. The residue is converted into the cyclohexylsulfamate salt in acetone, yielding, after drying in vacuo at 50°C, 1-{1,2,3,6-tetrahydro-1-[3-(2-trifluoromethyl-10-phenothiazinyl)-propyl]-4-pyridyl} -2-benzimidazolinone cyclohexanesulfamate; mp. 198°–275°C(dec.).

EXAMPLE VIII

A mixture of 2 parts of 10-(3-chloropropyl)-2-phenothiazine-N,N-dimethylsulfonamide, 1.19 parts of 1-(4-piperidyl)-2-benzimidazolinone, 0.88 parts of sodium carbonate and 8.5 parts of dimethylformamide is stirred at 95°–100°C (water-bath) for 16 hours. The reaction mixture is cooled, filtered over hyflo and upon the addition of water, the product is precipitated. It is purified by column-chromatography over silicagel, using a mixture of chloroform and 10% of methanol as eluent. The pure fractions are collected and the eluent is evaporated. The oily residue is crystallized from acetone at −20°C, yielding, after drying in vacuo at 110°C for 18 hours, 1-[1-{3-[2-(dimethylaminosulfonyl)-10-phenothiazinyl]-propyl} -4-piperidyl]-2-benzimidazolinone; mp. 234.2°C.

We claim:

1. A chemical compound selected from the group consisting of a [(phenothiazinyl)propyl]piperidyl-benzimidazolinone having the formula:

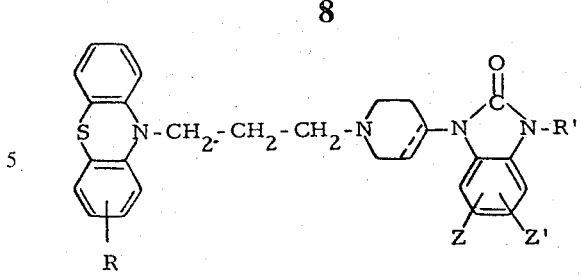

and the therapeutically active acid addition salts thereof, wherein R is a member selected from the group consisting of hydrogen, halo, trifluoromethyl and dimethylaminosulfonyl; Z and Z' are selected from the group consisting of hydrogen, halo and methyl; R' is selected from the group consisting of hydrogen and loweralkyl; and
the dotted line indicates an optional double bond.

2. A chemical compound selected from the group consisting of a [(phenothiazinyl)propyl]piperidyl-benzimidazolinone having the formula:

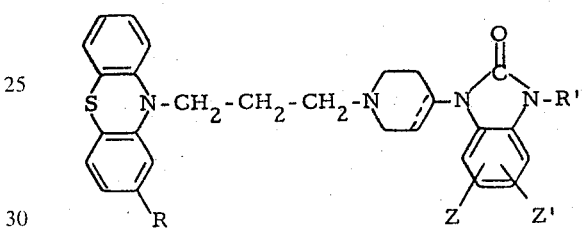

and the therapeutically active acid addition salts thereof, wherein R is a member selected from the group consisting of hydrogen, halo, trifluoromethyl and dimethylaminosulfonyl;
Z and Z' are selected from the group consisting of hydrogen, halo and methyl;
R' is selected from the group consisting of hydrogen and loweralkyl; and
the dotted line indicates an optional double bond.

3. 1-{1-[3-(10-Phenothiazinyl)propyl]-4-piperidyl}-2-benzimidazolinone.

4. 1-[1-{3-[2-(α,α,α-Trifluoromethyl)-10-phenothiazinyl]-propyl}-4-piperidyl]-2-benzimidazolinone.

5. 1-{1-[3-(2-Chloro-10-phenothiazinyl)propyl]-4-piperidyl}-2-benzimidazolinone.

6. 5-Chloro-1,3-dihydro-1-[1-{3-[2-(trifluoromethyl)-10H-phenothiazin-10-yl]propyl}-4-piperidinyl]-2H-benzimidazol-2-one.

7. 1-{1,2,3,6-Tetrahyro-1-[3-(2-trifluoromethyl-10-phenothiazinyl)propyl]-4-pyridyl}-2-benzimidazolinone cyclohexanesulfamate.

8. 1-[1-{3-[2-(Dimethylaminosulfonyl)-10-phenothiazinyl]-propyl}-4-piperidyl]-2-benzimidazolinone.

* * * * *